US012317790B2

(12) United States Patent
Golden

(10) Patent No.: US 12,317,790 B2
(45) Date of Patent: Jun. 3, 2025

(54) GROWTH CONTROL ASSEMBLY FOR TREES, SHRUBS AND OTHER FOLIAGE UTILIZING LASER TECHNOLOGY

(71) Applicant: Richard Golden, Grosse Pointe Park, MI (US)

(72) Inventor: Richard Golden, Grosse Pointe Park, MI (US)

(73) Assignee: Richard Golden

( * ) Notice: Subject to any disclaimer, the term of this patent is extended or adjusted under 35 U.S.C. 154(b) by 89 days.

(21) Appl. No.: 18/368,638

(22) Filed: Sep. 15, 2023

(65) Prior Publication Data
US 2025/0089625 A1 Mar. 20, 2025

(51) Int. Cl.
*A01D 34/01* (2006.01)
*A01G 3/08* (2006.01)
*B23K 26/352* (2014.01)

(52) U.S. Cl.
CPC ............ *A01G 3/08* (2013.01); *B23K 26/352* (2015.10)

(58) Field of Classification Search
CPC ................................ B23K 26/352; A01G 3/08
USPC ....................................................... 219/121.85
See application file for complete search history.

(56) References Cited

U.S. PATENT DOCUMENTS

| | | | | |
|---|---|---|---|---|
| 3,652,844 A * | 3/1972 | Scott, Jr. | ............ | B23K 26/0006 47/DIG. 6 |
| 4,952,222 A * | 8/1990 | Tobias | ................. | A01D 34/015 47/1.3 |
| 5,546,217 A * | 8/1996 | Greenway | ............... | G02B 26/10 359/223.1 |
| 6,269,617 B1 * | 8/2001 | Blanchard | ............ | A01D 34/015 219/121.76 |
| 6,374,584 B1 * | 4/2002 | Blanchard | ............ | A01D 34/015 219/121.76 |
| 6,795,568 B1 * | 9/2004 | Christensen | .......... | A01M 21/04 382/110 |
| 7,919,723 B2 * | 4/2011 | Ide | ........................ | A01D 34/015 219/121.67 |
| 9,565,848 B2 * | 2/2017 | Stowe | .................... | A01M 21/04 |
| 9,609,859 B2 * | 4/2017 | Stowe | .................... | A01M 15/00 |
| 9,803,835 B2 * | 10/2017 | Gordon | .................... | F21V 29/90 |
| 10,455,776 B2 * | 10/2019 | Zhang | ...................... | A01G 7/00 |
| 12,185,712 B2 * | 1/2025 | Pardell | ..................... | F21V 5/008 |
| 2008/0244970 A1 * | 10/2008 | Ide | ........................ | A01D 34/015 43/132.1 |
| 2015/0075067 A1 * | 3/2015 | Stowe | ................... | A01D 34/835 47/1.3 |
| 2015/0114519 A1 * | 4/2015 | Hyde | ..................... | A01G 23/08 144/4.1 |
| 2017/0094909 A1 * | 4/2017 | Bhavani | .................. | A01D 46/30 |
| 2018/0106219 A1 * | 4/2018 | Parker | ...................... | F02K 9/60 |
| 2018/0220589 A1 * | 8/2018 | Burden | .................. | A01G 3/085 |

(Continued)

*Primary Examiner* — Jimmy Chou
(74) *Attorney, Agent, or Firm* — Dinsmore & Shohl LLP

(57) ABSTRACT

A laser assembly for controlling foliage growth including a body adapted to being mounted at a location in order to emit an axial direction defining laser pattern to establish a growth limiting boundary for any of a tree, shrub or like foliage. The laser pattern provides a high intensity light beam causing cellular damage to tissue of the foliage in order to retard growth into the affected area. The body further includes at least one eyepiece for issuing the laser pattern according to any of a pin-point or arcuate/sweep pattern. A clamp or post arrangement mounts the body in a multi-axial adjustable fashion.

7 Claims, 4 Drawing Sheets

(56) References Cited

U.S. PATENT DOCUMENTS

2019/0380278 A1\* 12/2019 Burden .................... B25J 9/003
2022/0394930 A1\* 12/2022 Tamblyn .................. A01G 3/08
2022/0394931 A1\* 12/2022 Umeya .................. G06V 20/17

\* cited by examiner

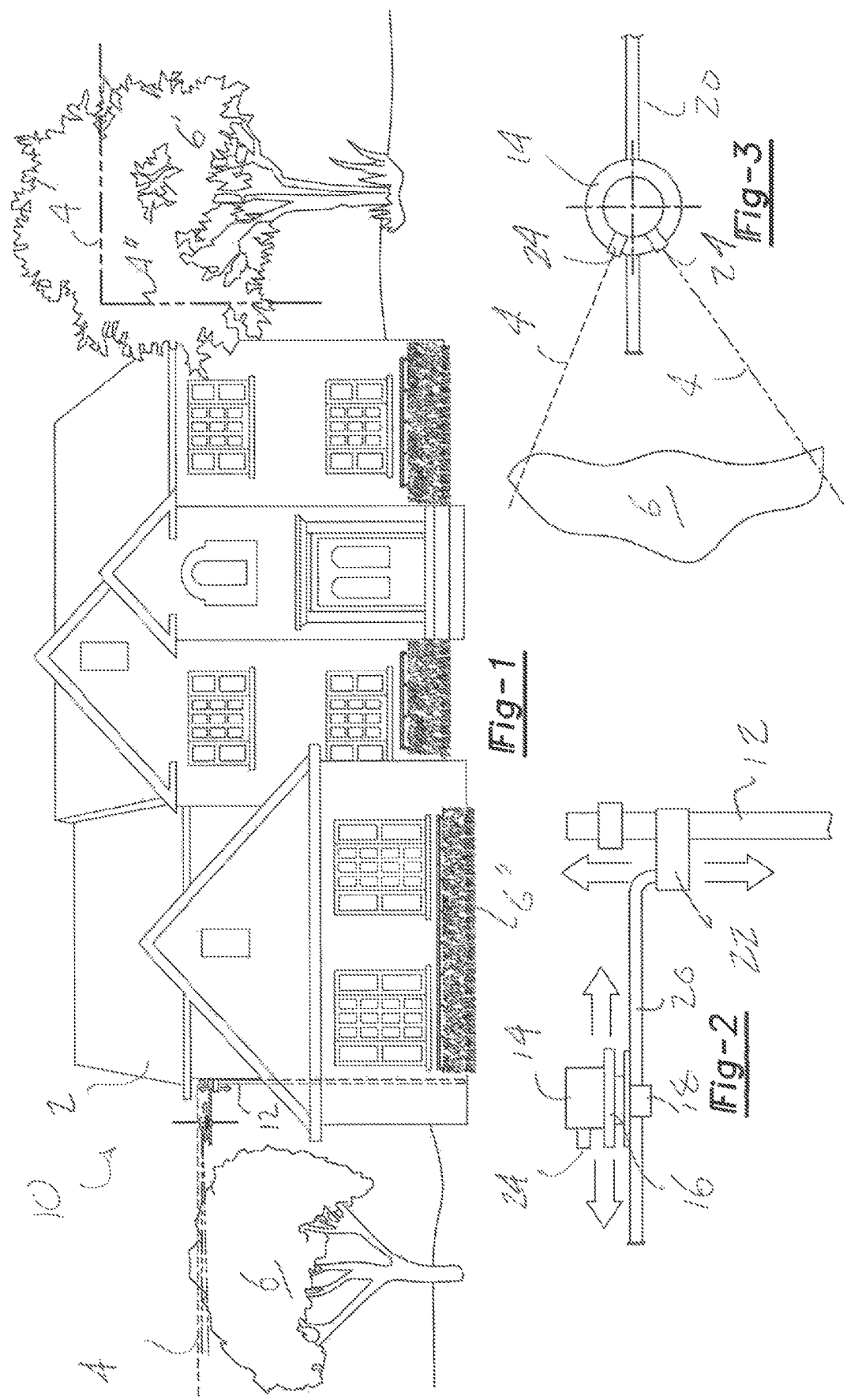

GROWTH CONTROL ASSEMBLY FOR TREES, SHRUBS AND OTHER FOLIAGE UTILIZING LASER TECHNOLOGY

CROSS REFERENCE TO RELATED APPLICATIONS

The present application claims the priority of U.S. Ser. No. 63/408,171 filed Sep. 20, 2022.

FIELD OF THE INVENTION

The present invention teaches a novel assembly for utilizing laser technology, in particular solar powered lasers, for controlling the growth of foliage associated with trees and shrubs.

BACKGROUND OF THE INVENTION

Uncontrolled growth of trees and foliage, in particular occurring in established residential or commercial areas, provides many challenges such as interference with power lines and other structures, as well as general nuisance through impairing sight line visibility in the instance of an overgrown tree.

As is also known, LASER is an acronym for Light Amplification by the Stimulated Emission of Radiation. According to several definitions, a laser is defined as creating a uniform and coherent light that is different from other types of illuminating devices in that it delivers light in in an almost perfectly parallel beam (defined as collimated) and which can approach a single wavelength. In this fashion, laser light can be focused down to a spot as small as a single wavelength and/or can be continuous or pulsed in use with a myriad of applications.

Technical studies have also shown that specific types of high intensity light beams emitted by lasers can cause necrosis (also termed cellular damage) of plant or foliage tissue. It has also been determined that, in response to the presence of such necrosis inducing lasers, such foliage will avoid further growth into the affected area.

SUMMARY OF THE INVENTION

The present invention provides laser light assemblies including, in one particular non-limiting application, solar powered lasers for use in limiting the growth of trees, shrubs and related foliage. As will be described in additional detail, the present invention contemplates a variety of high intensity laser assemblies which can be mounted to any fixed structure (tree, house, utility pole, or other ground secured post) and which issue a continuous parallel beam across a given area (or sweep) in order to restrain or prevent growth of foliage into the monitored area.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an environmental view of a foliage growth inhibiting laser assembly according to a first non-limiting application of the present inventions;

FIG. 2 is an enlarged view of the laser assembly of FIG. 1;

FIG. 3 is an overhead view of the structure mounted laser of FIG. 1 and further depicting the range or sweep of the laser patterns for establishing an area within which foliage expansion is prevented;

DETAILED DESCRIPTION OF THE PREFERRED EMBODIMENTS

Figure 4:
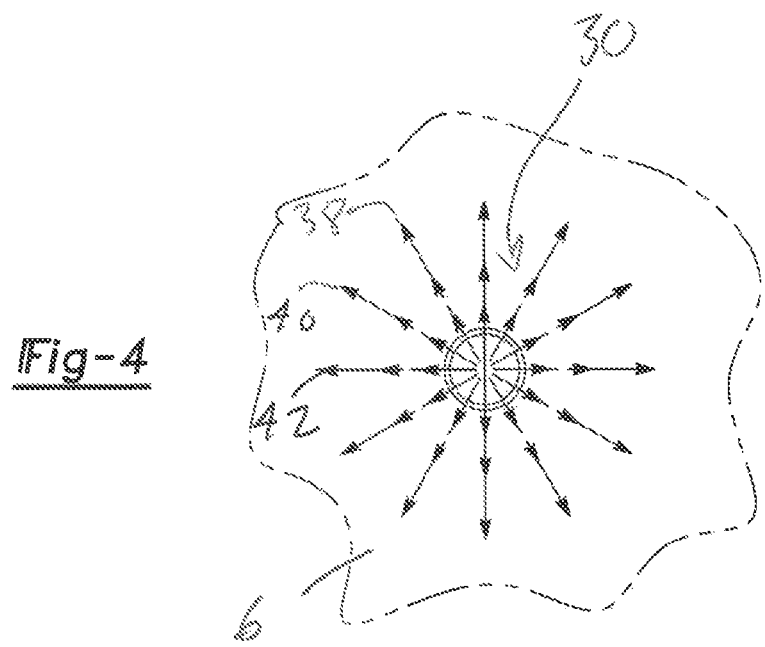
FIGS. 4-5 illustrated a pair of top and side views of a foliage growth inhibiting laser assembly according to a further preferred embodiment and which is depicted secured to an elevated location of a tree to prevent further vertical growth.

With reference to the attached illustrations, the present invention discloses the utilization of a solar powered laser for use in limiting the growth of trees, shrubs and related foliage. As will be described in additional detail with reference to the several drawing figures, the present invention contemplates a variety of high intensity laser assemblies which can be mounted to any fixed structure (tree, house, utility pole, or other ground secured post) and which issue a continuous parallel beam across a given area (or sweep) in order to restrain or prevent growth of foliage into the monitored area.

Referring first to FIG. 1, an environmental view is generally provided at 10 of a foliage growth inhibiting laser assembly according to a first non-limiting application of the present inventions. As shown, the laser assembly 10 is depicted secured to an elevated location of a residential structure 2, with the laser establishing a continuous scan or sweep (see at 4 in each of FIGS. 1 and 3) in order to define a target plane into which growth of foliage (see in FIG. 1 represented by tree 6) is prevented, again due to the necrosis effect (also termed cellular damage) to the plant or foliage tissue resulting from the constant laser image being projected. Without limitation, the laser assembly 10 can be alternatively secured to any of a tree, light/utility post or other ground supported post or beam in order to define and establish an elevated location for Such foliage growth is typical in summer or warm weather months and, by virtue of the placement and arrangement of the solar powered lasers, operates to define limits in the direction of permitted foliage growth. As shown in FIG. 1, the projected laser scan 4 prevents upward growth of the foliage into the area/sweep of the laser scan, however the foliage will be permitted to expand/grow horizontally or in any other direction in which a laser projection is not imposed. A further example in FIG. 1 of a multi-axial laser projection can include such as shown by projection axes 4' and 4" projected through secondary foliage generating tree 6', such being provided by a singular or pair of laser generating assemblies arrayed in any desired fashion.

FIG. 2 is an enlarged view of the laser assembly of FIG. 1 and which includes a support post 12 (again shown in FIG. 1 secured to an external side of the residential structure however also contemplating a ground support location). A laser unit 14 is depicted which can be secured upon a platform 16, which is in turn horizontally adjustable, via an underside coupling 18, along a horizontal rod 20. The rod includes an angled end which seats into a second coupling 22 which is further vertically adjustable along the support post 12 in a manner to adjust both the height, angle and sweep of the projected laser patterns 4 relative to the tree foliage 4.

As is further understood, the portable laser unit disclosed can be of a conventional design which provides for a suitable beam (including pin-point or arcuate/sweeping in construction). It is also understood that the laser assembly can be solar powered in one non-limiting embodiment and can include a solar collecting unit disposed upon an upper light receiving face. It is also understood that the use of laser type assemblies conventionally powered through electrical or portable battery supply are also envisioned as being within the scope of the invention.

FIG. 3 is an overhead view of the structure-mounted laser of FIG. 1, and further depicting the range or sweep of the laser patterns for establishing an area within which foliage expansion is prevented. Without limitation, the laser unit 14 can be either fixed or rotatably mounted to the platform 16, with the laser unit further including beam generating eyepieces 24 for generating the individual laser patterns 4, and which are shown to be provided in either pin point or arcuate sweeping fashion in order to define a horizontal projected array or range through which foliage growth is retarded.

Figure 5:
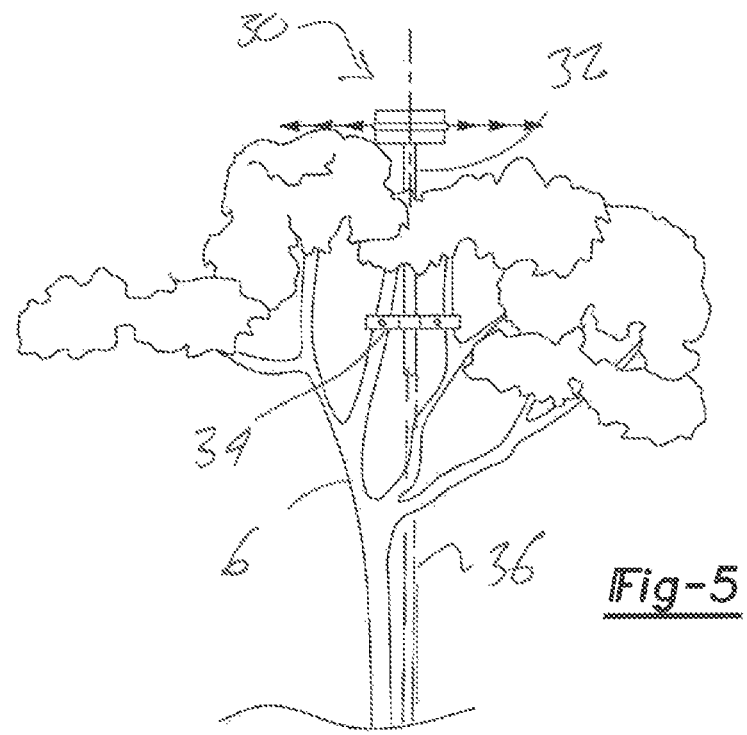

Proceeding to FIGS. 4-5, illustrated are a pair of top and side views of a foliage growth inhibiting laser assembly, generally at 30, according to a further preferred embodiment and which is depicted secured to an elevated location of a tree 6 to prevent further vertical growth. As previously described, the solar laser assembly can be secured to either the tree (via post 32 and bracket 34 mounts) or can be extended (via post extension 36) to a ground secured location.

As further shown, the laser pattern or sweep produced by the assembly 30 can be multi-directional (again either pinpoint or arcuate/sweeping in design), as referenced by individual emitted patterns 38, 40, 42, et seq., and in a fashion in which vertical foliage growth is limited. Without limitation, any of the intensity, angle and/or direction of the solar generated laser patterns can be adjusted to manage the direction of growth of the tree, shrub or other foliage along any of multiple directional axes.

Figure 6:
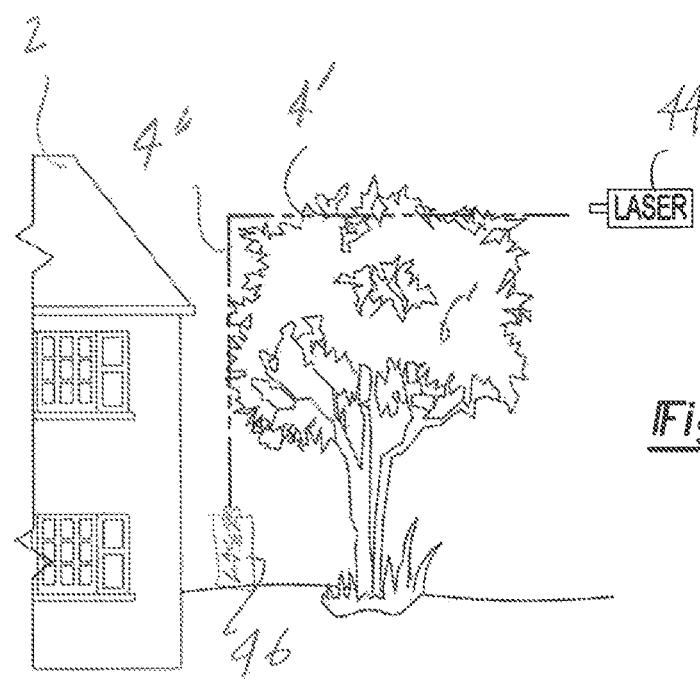
FIG. 6 presents an environmental illustration of a pair of outdoor mounted lasers according to a further embodiment for use in restricting foliage growth of a tree along two perpendicular planes.

FIG. 6 presents an environmental illustration of a pair of outdoor mounted lasers 44 and 46, similar to the arrangement shown in FIG. 1, and according to a further embodiment for use in restricting foliage growth of a tree along two perpendicular planes, again depicted by horizontal axis 4' and intersecting vertical axis 4".

Figure 7:
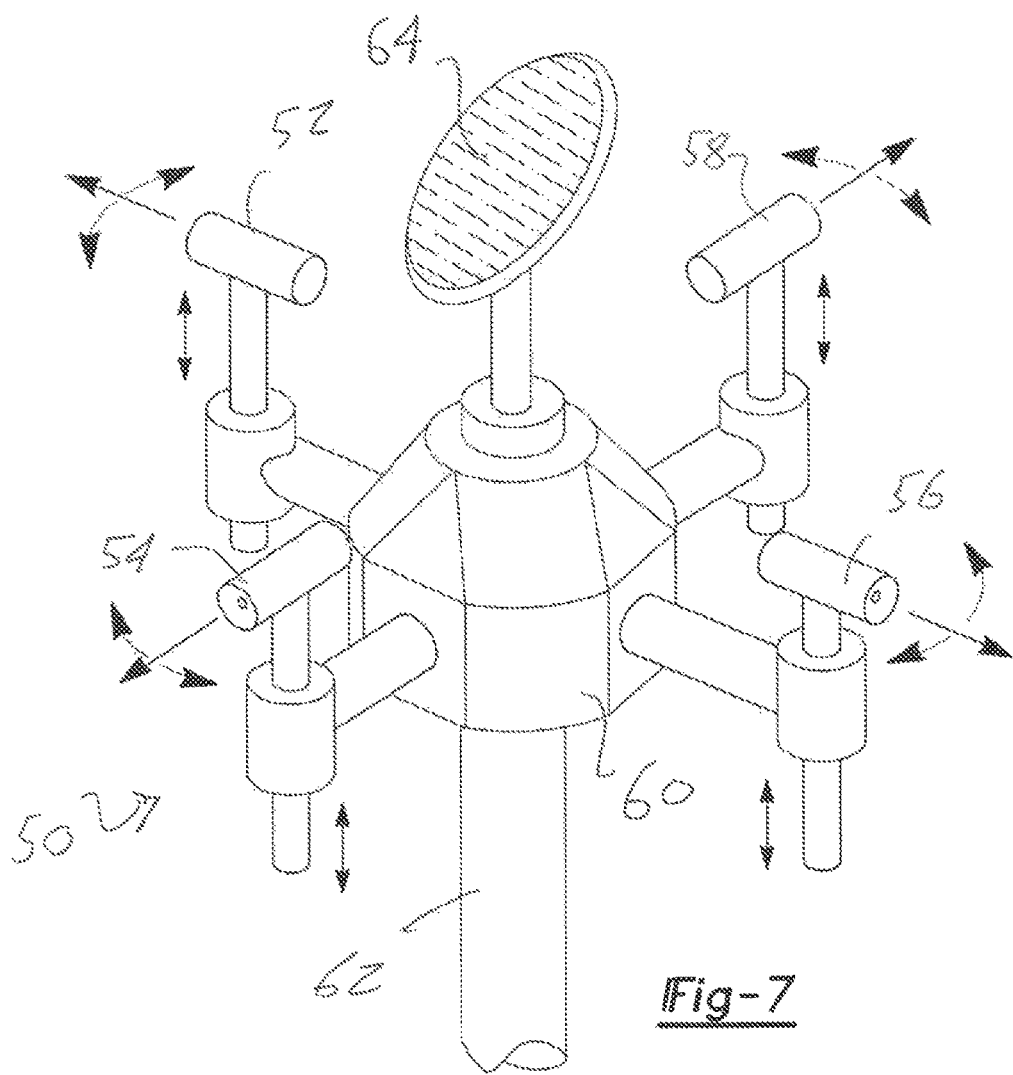
FIG. 7 is a perspective view of a solar pointed laser according to a further non-limiting application and incorporating multiple and independent adjustable laser points.

FIG. 7 is a perspective view of a solar pointed laser, see generally at 50, according to a further non-limiting application and incorporating at least one eyepiece, in this embodiment depicted by multiple and independent axially adjustable laser generating units 52, 54, 56 and 58. The individual units are each in turn secured to an intermediate platform 60, which is either fixed or height adjustable along a vertical post 62. A solar collecting disc 64 is shown which is mounted above the laser assembly and which provide power to the individual laser units. In this fashion, the laser assembly 50 can be configured to provide multiple projected axes or sweeps to monitor or constrain/prevent growth of foliage into the projected target areas (see again at 4 in FIG. 1).

Figure 8:
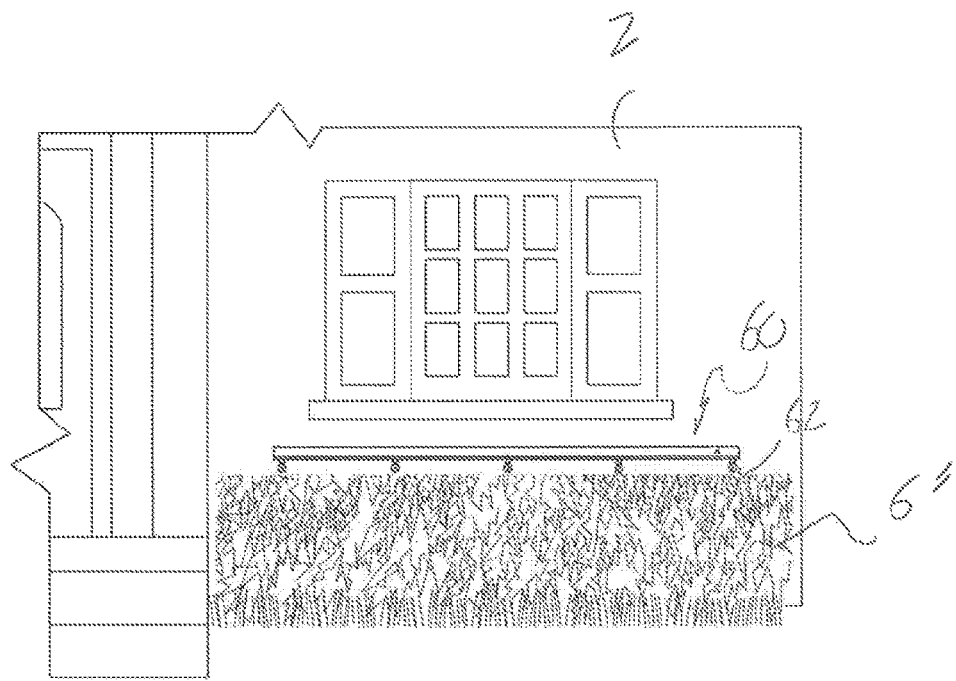
FIG. 8 provides a further environmental illustration of a plurality of laser pointers incorporated into a strip array mounted to a structure exterior in order to prevent vertical growth of monitored shrubs.

FIG. 8 provides a further environmental illustration of a plurality of laser pointers incorporated into a strip array, see generally at 60, which is mounted to a structure 2 exterior in order to prevent vertical growth of monitored shrubs, at 6". This is also depicted in the original embodiment of FIG. 1 along with the elevated mounted solar laser assembly 10 in order to monitor tree top foliage growth.

Figures 9, 10:
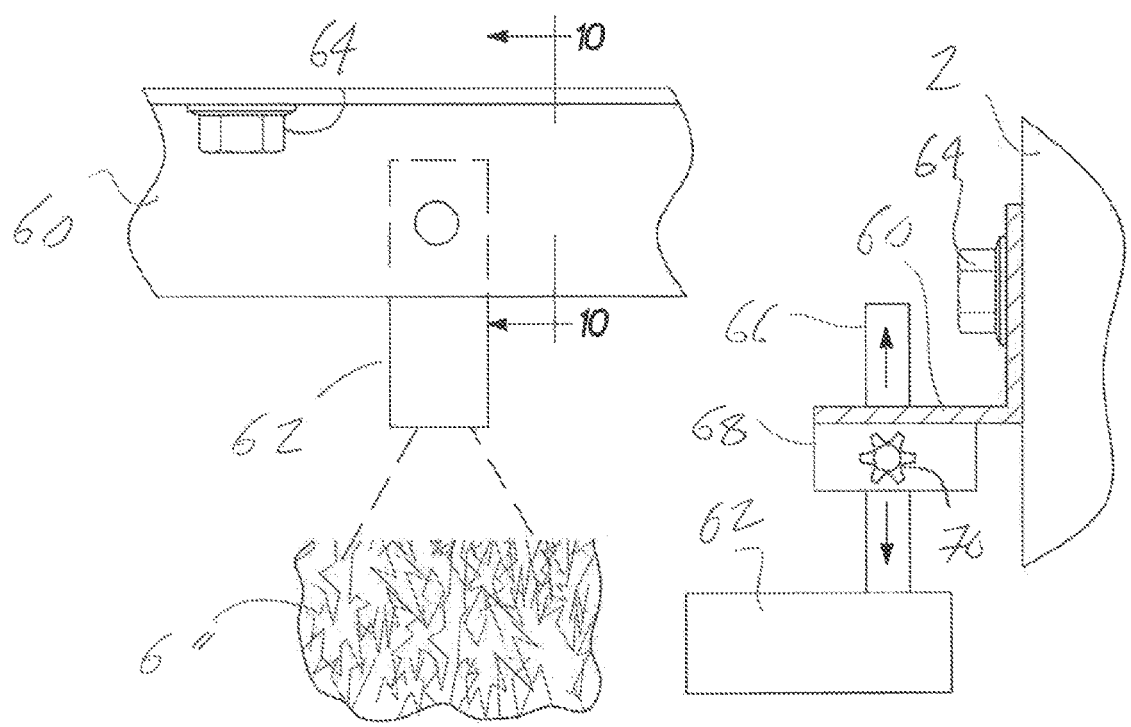
FIG. 9 presents an enlarged overhead looking view of a single one of the individual lasers of FIG. 8.
FIG. 10 is a cutaway taken alone line 10-10 of FIG. 9 and depicting the height adjustability of the laser pointers.

FIG. 9 presents an enlarged overhead looking view of a single one of the individual lasers 62 incorporated into the strip 60 of FIG. 8, with FIG. 10 further providing a cutaway taken alone line 10-10 of FIG. 9 and depicting the height adjustability of the individual laser pointers 62 located along the strip 60. As shown, the strip 60 can include an "L" shaped bracket which mounts to the exterior of the structure 2 (such as via fasteners 64).

A vertical rod or support 66 suspends the individual laser pointer 62, with the rod 66 in turn being channeled through a base portion 68 affixed to the extending leg of the bracket 60 and including an access/tightening knob 70 to permit vertical adjustment of the individual pointers 62 to define an upper limit of permitted growth as defined by the laser images projected. Although note shown, additional laser units can be mounted in a vertically directed fashion aligning with an outer continuous edge of the shrubs 6" in order to likewise dictate outgrowth of foliage along the outer vertical face of the shrub line (given further that such shrubs typically grow outward in a direction away from the structure by which they may be planted).

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including". "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A laser assembly for controlling foliage growth, comprising:
   a plurality of independent laser generating units multi-axially and rotatably supported at elevated locations upon a fixed common body which is in turn supported upon a vertical post, each of said laser generating units emitting axial direction defining laser patterns to establish a growth limiting boundary for any of a tree, shrub or like foliage;
   a solar powered element connected to said common body for powering said laser generating units; and
   said laser patterns each providing a high intensity light beam causing cellular damage to tissue of the foliage in order to retard growth into an affected area.

2. The laser assembly of claim 1, said laser generating units each further comprising at least one eyepiece for issuing the laser pattern according to any of a pin-point or arcuate/sweep pattern.

3. The laser assembly of claim 1, further comprising a clamp or post arrangement for mounting said laser generating units in said multi-axial and rotatably adjustable fashion.

4. The laser assembly of claim 1, said common body further comprising a strip array for securing a plurality of said bodies in linearly spaced apart fashion.

5. A laser assembly for controlling foliage growth, comprising:
   a plurality of independent adjustable laser generating units supported upon a platform fixedly in turn secured at an elevated location;
   each of said laser generating units being adjustable both multi-axially and rotatably relative to said fixed platform in order to emit individual axial directed and defining laser patterns to establish a growth limiting boundary for any of a tree, shrub or like foliage;
   a solar powered element connected to said common body for powering said laser generating units; and
   said laser patterns configured to provide high intensity light beams along the multiple projected axes causing cellular damage to tissue of the foliage in order to retard growth into an affected area.

6. The laser assembly of claim 5, said laser generating units each further comprising at least one eyepiece for issuing the laser pattern according to any of a pin-point or arcuate/sweep pattern.

7. The laser assembly of claim 5, further comprising a clamp or post arrangement for mounting said laser generating units in said multi-axial and rotatably adjustable fashion.

* * * * *